(12) United States Patent
Kawanai

(10) Patent No.: US 10,846,546 B2
(45) Date of Patent: Nov. 24, 2020

(54) TRAFFIC SIGNAL RECOGNITION DEVICE

(71) Applicant: TOYOTA JIDOSHA KABUSHIKI KAISHA, Toyota (JP)

(72) Inventor: Taichi Kawanai, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 117 days.

(21) Appl. No.: 16/258,985

(22) Filed: Jan. 28, 2019

(65) Prior Publication Data
US 2019/0244041 A1    Aug. 8, 2019

(30) Foreign Application Priority Data

Feb. 2, 2018  (JP) ................................ 2018-017561

(51) Int. Cl.
*G06K 9/00* (2006.01)

(52) U.S. Cl.
CPC ..... *G06K 9/00825* (2013.01); *G06K 9/00818* (2013.01)

(58) Field of Classification Search
CPC ................ G06K 9/00825; G06K 9/00818
See application file for complete search history.

(56) References Cited

U.S. PATENT DOCUMENTS

| 2009/0303077 | A1  | 12/2009 | Onome et al. |
| 2016/0305794 | A1* | 10/2016 | Horita ............... G01C 21/26 |
| 2017/0024622 | A1* | 1/2017  | Mizutani ........... G06K 9/00825 |
| 2019/0171891 | A1* | 6/2019  | Ferguson ........... B60W 40/00 |

FOREIGN PATENT DOCUMENTS

| JP | 2006-004173 A | 1/2006  |
| JP | 2006-309450 A | 11/2006 |
| JP | 2007-241469 A | 9/2007  |
| JP | 2016-024572 A | 2/2016  |
| JP | 2016-038757 A | 3/2016  |
| JP | 2016-042226 A | 3/2016  |

OTHER PUBLICATIONS

Lindner, et al., "Robust Recognition of Traffic Signals", IEEE Intelligence Vehicles Symposium, University of Parma, Jun. 14, 2004, pp. 49-53.

* cited by examiner

*Primary Examiner* — Wayne H Cai
(74) *Attorney, Agent, or Firm* — Sughrue Mion, PLLC

(57) ABSTRACT

A traffic signal recognition device includes a traffic signal related database that stores traffic signal data and surrounding structure data of a surrounding structure existing around a traffic signal, an imaging possibility determination unit that determines whether or not the traffic signal can be imaged by the camera, a search area setting unit that sets a search area having a size corresponding to a position error range of the traffic signal in the captured image if it is determined that the traffic signal can be imaged, and a traffic signal recognition unit that recognizes a lighting state of the traffic signal in the search area.

2 Claims, 9 Drawing Sheets

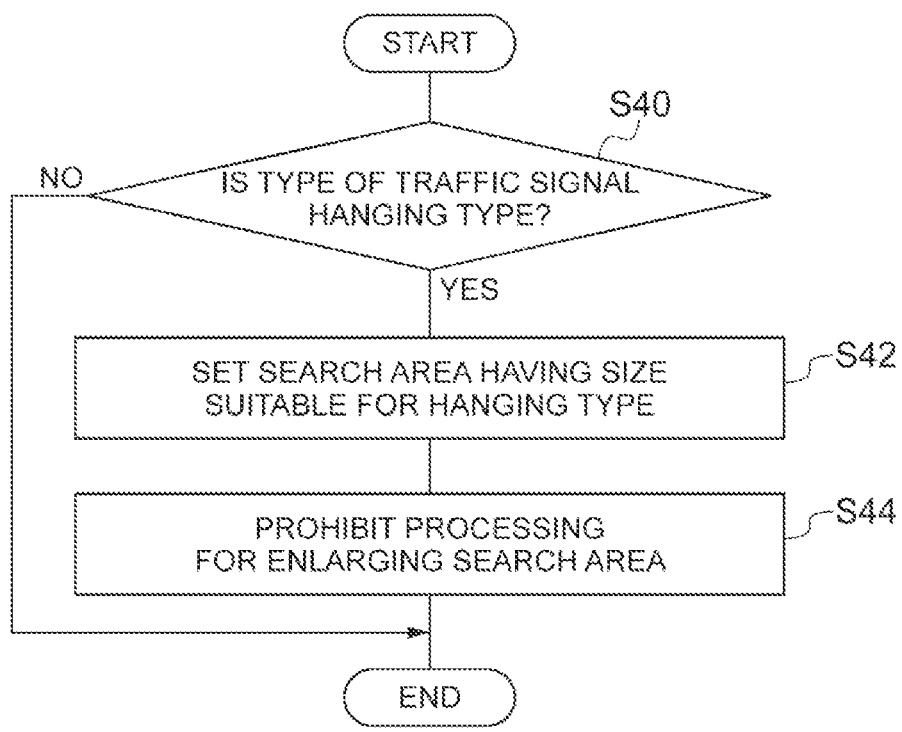

TRAFFIC SIGNAL RECOGNITION DEVICE

TECHNICAL FIELD

The present disclosure relates to a traffic signal recognition device.

BACKGROUND

In the related art, as a technical literature relating to a traffic signal recognition device, Japanese Unexamined Patent Publication No. 2006-309450 is known. In this publication, an image recognition device that searches for an object to be recognized in an image captured by a camera based on map information in which a position of the object to be recognized such as a traffic signal is recorded and a position of a vehicle (the camera) on a map, is disclosed. In this image recognition device, by setting the search area such that the searched object to be recognized is included in the image, and by performing the image recognition focusing on the search area, the speed of processing for recognizing the traffic signal and the like is improved compared to the case of image recognition of the entire captured image.

CROSS-REFERENCE TO RELATED APPLICATION

This application claims the benefit of priority from Japanese Patent Application No. 2018-017561, filed Feb. 2, 2018, the entire contents of which are incorporated herein by reference.

SUMMARY

However, as in the device described above, when the image recognition is performed focusing on the search area out of the image captured by camera, if a positional deviation of the search area occurs and a part or all the traffic signal deviates from the search area, there may be a problem in that the lighting state of the traffic signal cannot be recognized by the image recognition in the search area. For this reason, an appropriate measures against the positional deviation of the search area is required.

Therefore, in this technical field, it is desired to provide a traffic signal recognition device which can prevent the problem in that lighting state of the traffic signal cannot be recognized due to the positional deviation of the search area.

In the present disclosure, there is provided a traffic signal recognition device that is configured to set a search area in an image captured by a camera in a vehicle and to recognize a traffic signal in the search area. The device includes: a vehicle position recognition unit configured to recognize a position of the vehicle on a map; an object recognition unit configured to recognize an object around the vehicle based on at least one of a result of detection performed by a radar sensor in the vehicle and the image captured by the camera; a traffic signal related database configured to store traffic signal data including information on a position of the traffic signal on the map and information on a shape of the traffic signal, and surrounding structure data including information on a position of a surrounding structure on the map existing around the traffic signal and information on a shape of the surrounding structure; a position determination unit configured to determine whether or not the vehicle is positioned in a traffic signal recognition range set in advance based on the position of the vehicle on the map and the information on the position of the traffic signal on the map; an imaging possibility determination unit configured to determine whether or not the traffic signal can be imaged by the camera, based on the position of the vehicle on the map, a result of recognition performed by the object recognition unit, the traffic signal data and the surrounding structure data, if it is determined by the position determination unit that the vehicle is positioned in the traffic signal recognition range; a position error range calculation unit configured to recognize a position error range of the traffic signal with respect to the vehicle based on the result of recognition performed by the object recognition unit and the traffic signal data and the surrounding structure data, if it is determined by the position determination unit that the vehicle is positioned in the traffic signal recognition range; a search area setting unit configured to set the search area having a size corresponding to the position error range in the captured image, if it is determined by the imaging possibility determination unit that a traffic signal can be imaged by the camera; and a traffic signal recognition unit configured to recognize a lighting state of the traffic signal in the search area if the search area is set. The traffic signal recognition unit re-recognizes the lighting state of the traffic signal in the search area after performing the processing for enlarging the search area when the lighting state of the traffic signal in the search area cannot be recognized, and while the lighting state of the traffic signal in the search area cannot be recognized, the traffic signal recognition unit repeats the enlargement processing and the re-recognition until the number of times of the enlargement processing is equal to or greater than a number of times threshold value.

According to the traffic signal recognition device in an aspect of the present disclosure, if it is determined that the vehicle is positioned in the traffic signal recognition range, since whether or not the traffic signal can be imaged by the camera is determined using the surrounding structure data as well as the traffic signal data, it is possible to improve the accuracy of the determination whether or not the traffic signal can be imaged compared to the case where only the traffic signal data is used. In addition, in the traffic signal recognition device, if it is determined that the traffic signal can be imaged by the camera, since a search area having a size corresponding to the position error range is set in the captured image, it is possible to set the search area having an appropriate size considering the position error range. Moreover, according to the traffic signal recognition device, when the lighting state of the traffic signal cannot be recognized within the search area, the traffic signal is re-recognized in the search area after the processing for enlarging the search area, while the lighting state of the traffic signal cannot be recognized, the enlargement processing and the re-recognition are repeated until the number of times of enlargement processing becomes equal to or greater than the number of times threshold value. Therefore, even if the positional deviation of the search area occurs, the lighting state of the traffic signal can be recognized by enlarging the search area, it is possible to prevent the problem in that the lighting state of the traffic signal cannot be recognized due to the positional deviation of the search area.

In the traffic signal recognition device in another aspect, the traffic signal data may include information on the type of the traffic signal. If the type of the traffic signal is a hanging type, the search area setting unit may set the search area having a size set in advance suitable for the hanging type rather than the search area having a size corresponding to the position error range. If the type of the traffic signal is a hanging type, even when the lighting state of the traffic signal in the search area cannot be recognized, the traffic signal recognition unit may not perform the enlargement processing and the re-recognition.

According to the traffic signal recognition device in the aspects of the present disclosure, it is possible to prevent the problem in that the lighting state of the traffic signal cannot be recognized due to the positional deviation of the search area.

BRIEF DESCRIPTION OF THE DRAWINGS

FIG. 9 is a flowchart illustrating an example of traffic signal type determination processing.

DETAILED DESCRIPTION

Hereinafter, embodiments of the present disclosure will be described with reference to the drawings.

First Embodiment

Figure 1:
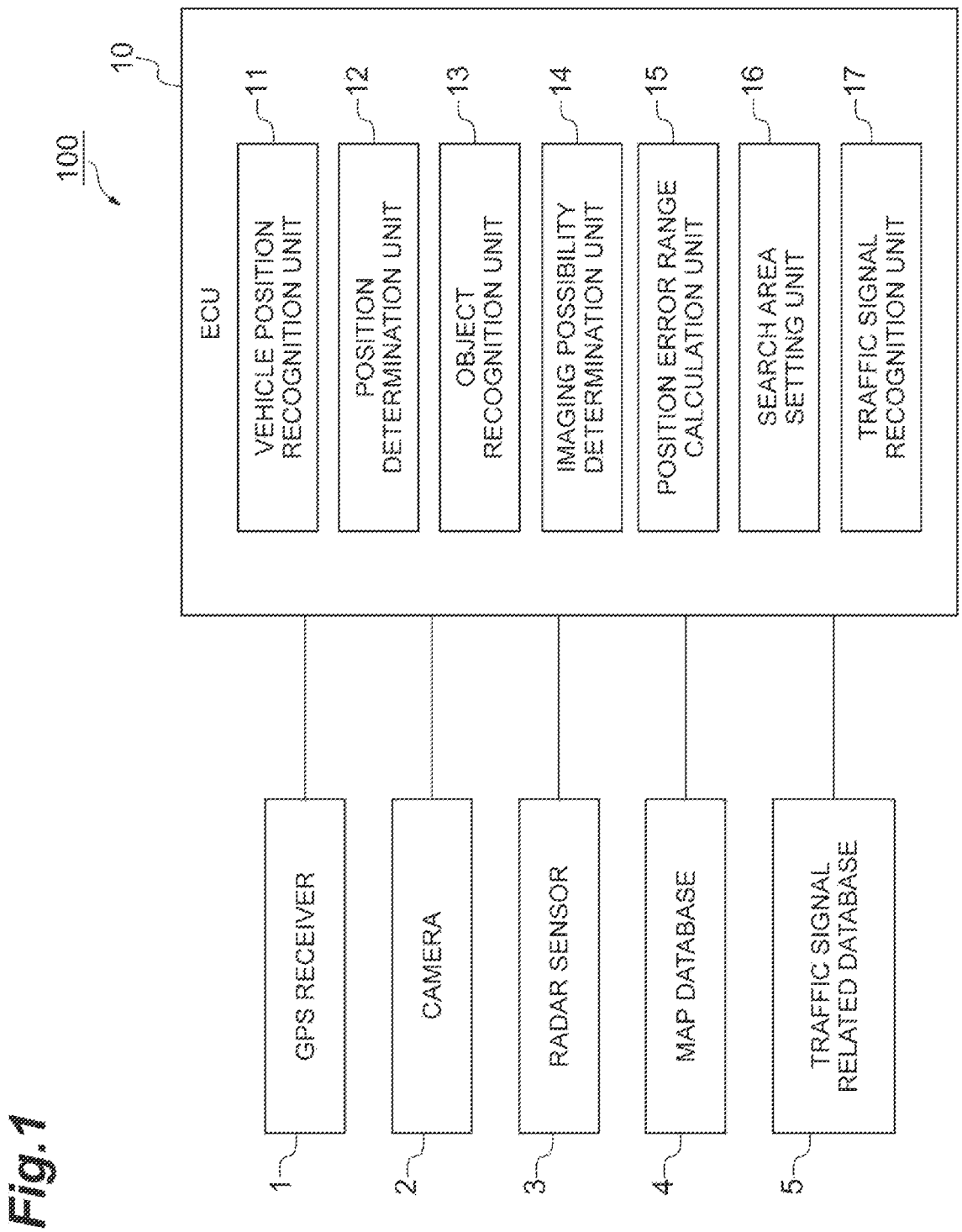
FIG. 1 is a block diagram illustrating a traffic signal recognition device in a first embodiment.

FIG. 1 is a block diagram illustrating a traffic signal recognition device in a first embodiment. A traffic signal recognition device 100 illustrated in FIG. 1 is mounted on a vehicle such as a passenger car and recognizes a lighting state of a traffic signal included in an image captured by a camera in the vehicle. The lighting state of the traffic signal includes at least a passing permission lighting state (for example, a green signal) and a passing prohibition lighting state (for example, a red signal). The lighting state of the traffic signal may include a transition lighting state (for example, a yellow signal) indicating a transition from the passing permission lighting state to the passing prohibition lighting state. The traffic signal may be limited to the traffic signal for the vehicle or may be able to recognize the traffic signal for the pedestrians.

Configuration of Traffic Signal Recognition Device in the First Embodiment

Hereinafter, a configuration of the traffic signal recognition device 100 in the first embodiment will be described with reference to the drawings. As illustrated in FIG. 1, the traffic signal recognition device 100 includes an electronic control unit (ECU) 10 that performs an overall management of the device. The ECU 10 is an electronic control unit including a central processing unit (CPU), read only memory (ROM), random access memory (RAM) and the like. In the ECU 10, various kinds of vehicle control are performed by loading the program stored in the ROM into the RAM and executing the program by the CPU. The ECU 10 may be configured with a plurality of electronic control units.

The ECU 10 is connected to a GPS receiver 1, a camera 2, a radar sensor 3, a map database 4, and a traffic signal related database 5.

The GPS receiver 1 measures a position of the host vehicle (for example, latitude and longitude of the host vehicle) by receiving signals from equal to or more than three GPS satellites. The GPS receiver 1 transmits information on the measured position of the host vehicle to the ECU 10.

The camera 2 is an imaging device that images external situations of the vehicle. The camera 2 is provided on the back side of the windshield of the vehicle as an example, and images in front of the vehicle. The camera 2 transmits a captured image of in front of the vehicle to the ECU 10. The camera may be a monocular camera or may be a stereo camera. In addition, the mounting position of the camera 2 is not limited to the back side of the windshield, but may be mounted on any position as long as capable of capturing the images in front of the vehicle. Not limited the direction in front of the vehicle, but the camera 2 is may be configured with a plurality of cameras that respectively captures a plurality of directions of the vehicle.

The radar sensor 3 is a detection device that detects objects (a utility pole, a traffic signal, and the like) around the vehicle using radio waves (for example, millimeter waves) or light. The radar sensor 3 includes, for example, millimeter wave radar or LIDAR (Light Detection and Ranging). The radar sensor 3 transmits the radio wave or light to the surroundings of the vehicle, and detects the objects by receiving radio waves or light reflected from the objects. The radar sensor 3 transmits the result of detection relating to the detected object to the ECU 10.

The map database 4 is a database that stores the map information. The map database 4 is formed, for example, in a hard disk drive (HDD) mounted on the vehicle. The map information includes information on the position of the road, information on the shape of the road (for example, types of curves or straight roads, a curvature of the curve, or the like), information on the position of the intersection and the branch. The map information may include traffic regulation information such as a legal speed associated with the information on a position. The map database 4 is not necessarily mounted on the vehicle but may be formed in a server capable of communicating with the vehicle.

The traffic signal related database 5 is a database that stores traffic signal data and surrounding structure data. The traffic signal data includes information on the position of the traffic signal on the map and information on the shape of the traffic signal. The information on the position of the traffic signal on the map means information on the position coordinates of the traffic signal on the map. The information on the shape of the traffic signal means information on the three-dimensional shape of the traffic signal.

The surrounding structure data includes information on the position of the surrounding structure on the map existing around the traffic signal and information on the shape of the surrounding structure. The surrounding structure is a structure used for estimating the position of the host vehicle (recognition of the position of the host vehicle) among the structures existing around the traffic signal, in combination with the traffic signal. The surrounding structure includes supporting body such as a support that supports the traffic signal, and road signs mounted on the same supporting body as the traffic signal, and the like. The support, the utility poles, poles, pedestrian bridges, tunnel inner walls, and the like may be included in the supporting bodies supporting the traffic signals. The surrounding structure does not necessarily include the entire supporting body, but may include only a part within a certain range from the traffic signal in the supporting body.

The surrounding structure may include a separate structure provided separately from the traffic signal around the traffic signal. The separate structure is a structure that is fixed relative to the road and includes utility poles that are different from the supporting body that supports the traffic signal. Specifically, the separate structure can include road signs supported by the traffic signal, a separate utility pole and the like, and road lights separated from the traffic signal. The information on the position of the surrounding structure on the map is information on the three-dimensional position of the surrounding structure on the map. The information on the shape of the surrounding structure is information on the three-dimensional shape of the surrounding structure. The traffic signal related database 5 may be configured as a database integrated with the map database 4, or may be formed in a server capable of communicating with the vehicle.

Next, a functional configuration of the ECU 10 will be described. The ECU 10 includes a vehicle position recognition unit 11, a position determination unit 12, an object recognition unit 13, an imaging possibility determination unit 14, a position error range calculation unit 15, a search area setting unit 16, and a traffic signal recognition unit 17. Some of the functions of the ECU 10 described below may be performed by a server capable of communicating with the vehicle.

The vehicle position recognition unit 11 recognizes the position of the vehicle on the map based on the information on the position from the GPS receiver 1 and the map information from the map database 4. In addition, the vehicle position recognition unit 11 may recognize the position of the vehicle on the map by simultaneous localization and mapping (SLAM) technology using the information on the position of the stationary obstacles such as utility poles included in the map information from the map database 4 and the image captured by the camera 2 or the result of detection performed by radar sensor 3. In addition to the map information from the map database 4, the vehicle position recognition unit 11 may use the traffic signal data and the surrounding structure data stored in the traffic signal related database 5. The vehicle position recognition unit 11 may also recognize the position of the vehicle on the map using a well-known method.

The position determination unit 12 determines whether or not the vehicle is positioned within a traffic signal recognition range set in advance based on the position of the vehicle on the map recognized by the vehicle position recognition unit 11 and the position of the traffic signal on the map in the traffic signal data. The traffic signal recognition range is a range on the map where the traffic signal can be imaged by the camera 2 in the vehicle.

For example, if a distance between the vehicle and the traffic signal in front of the vehicle becomes shorter than a distance threshold value, the position determination unit 12 determines that the vehicle is positioned in the traffic signal recognition range. The distance threshold value is value set in advance (in this case, the range from the traffic signal to the distance threshold value corresponds to the traffic signal recognition range). The traffic signal recognition range may be set in advance for each traffic signal in association with the map information in the map database 4, for example. The position determination unit 12 determines that the vehicle is positioned in the traffic signal recognition range when the position of the vehicle on the map is included in the traffic signal recognition range set in advance.

Figure 2:
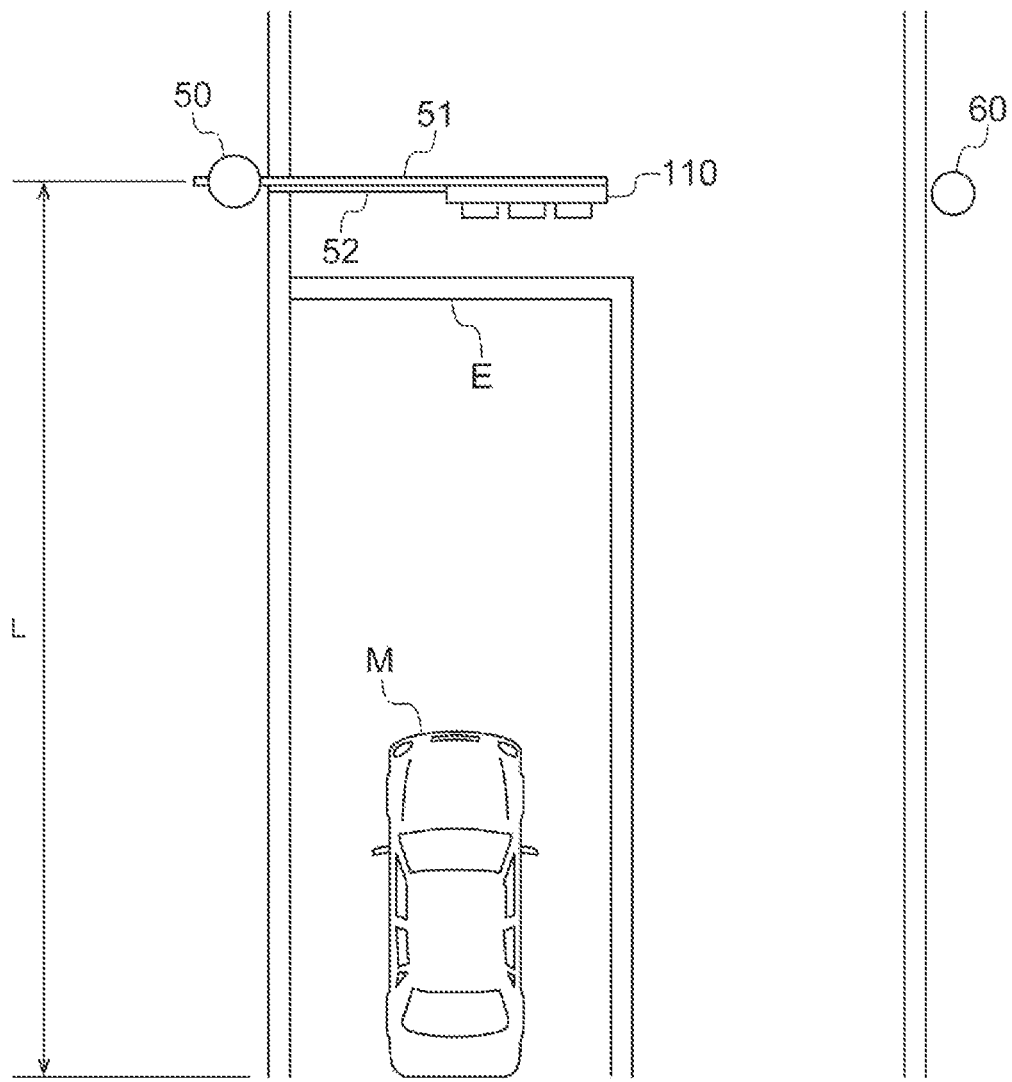
FIG. 2 is a plan view illustrating an example when a vehicle is positioned in a traffic signal imaging range.

Here, FIG. 2 is a plan view illustrating an example of a case where the vehicle is positioned in the traffic signal imaging range. In FIG. 2, a vehicle M, a stop line E, a traffic signal 110 in front of vehicle M, a pole 50 supporting the traffic signal 110, a mounting arm portion 51 extending in a lateral direction mounted on the pole 50, road information sign 52 mounted adjacent to the traffic signal 110 on the mounting arm portion 51, and a utility pole 60, are illustrated. The traffic signal 110 is a three-lamp type traffic signal having three lighting states: those are the passing permission lighting state (for example, a green signal), the transition lighting state (for example, a yellow signal), and the passing prohibition lighting state (for example, a red signal). The utility pole 60 is a separate structure provided separately from the traffic signal 110 around the traffic signal 110. In addition, in FIG. 2, the distance threshold value used for determining the traffic signal recognition range is indicated as L.

In the situation shown in FIG. 2, the position determination unit 12 determines that the vehicle M is positioned in the traffic signal recognition range (the traffic signal recognition range of traffic signal 110) based on the information on the position of the traffic signal 110 on the map stored in the traffic signal related database 5 and the position of the vehicle M on the map. Since the distance between the vehicle M and the traffic signal 110 is shorter than the distance threshold value L, the position determination unit 12 determines that the vehicle M is positioned in the traffic signal recognition range.

The object recognition unit 13 recognizes an object around the vehicle M based on the image captured by the camera 2 and the result of detection performed by the radar sensor 3. The object recognition unit 13 performs the object recognition by integrating the image captured by the camera 2 and the result of detection performed by the radar sensor 3 using well-known sensor information integration processing. The object recognition unit 13 performs the sensor information integration such as adding color information captured by the camera 2 to a three-dimensional detection point (reflection point of the light or the millimeter wave) detected by the radar sensor 3. The object recognition unit 13 recognizes a position of the object relative to the vehicle M and the shape of the object.

The object recognition unit 13 does not necessarily need to use both the image captured by the camera 2 and the result of detection performed by the radar sensor 3. The object recognition unit 13 may use only the result of detection performed by the radar sensor 3 or may use only the image captured by the camera 2 for the object recognition. When only the image captured by the camera 2 is used for the object recognition, it is not necessary to provide the radar sensor 3.

If the position determination unit 12 determines that the vehicle is positioned in the traffic signal recognition range, the imaging possibility determination unit 14 determines whether or not the traffic signal can be imaged by the camera 2 based on the position of the vehicle on the map recognized by the vehicle position recognition unit 11, the result of recognition performed by the object recognition unit 13, the traffic signal data in the traffic signal related database 5, and the surrounding structure data.

First, the imaging possibility determination unit 14 extracts traffic signals and surrounding structures existing around the vehicle from the traffic signal data and the surrounding structure data included in the traffic signal related database 5 with reference to the position of the vehicle on the map. In the situation illustrated in FIG. 2, the imaging possibility determination unit 14 extracts the traffic signal 110 in front of the vehicle M, and extracts the poles 50, the road information sign 52, the utility pole 60 as the surrounding structure of the traffic signal 110.

Figure 3A:
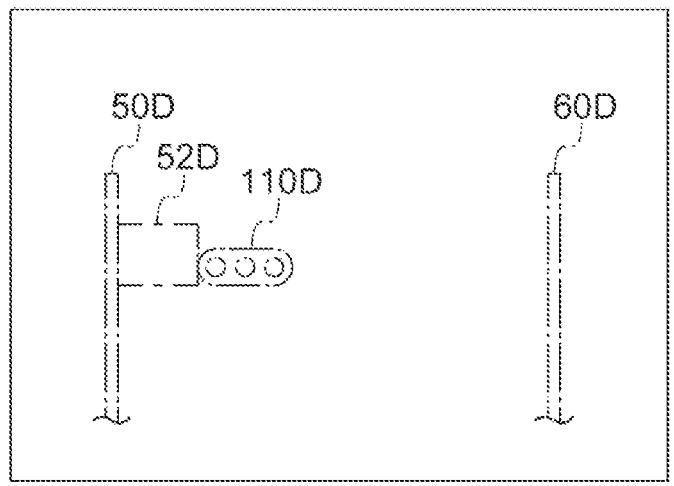
FIG. 3A is a diagram illustrating a traffic signal in front of the vehicle and a surrounding structure extracted from a traffic signal related database.

Next, the imaging possibility determination unit 14 performs collation (matching) between the traffic signal and the surrounding structure extracted from the traffic signal related database 5 and the result of recognition performed by the object recognition unit 13. Here, FIG. 3A is a diagram illustrating the traffic signal 110 in front of the vehicle and the surrounding structure extracted from the traffic signal related database 5. In FIG. 3A, the traffic signal 110 in the traffic signal related database 5 is indicated as a reference sign 100D, the pole 50 is indicated as a reference sign 50D, the road information sign 52 is indicated as a reference sign 52D and the utility pole 60 is indicated as a reference sign 60D.

Figure 3B:
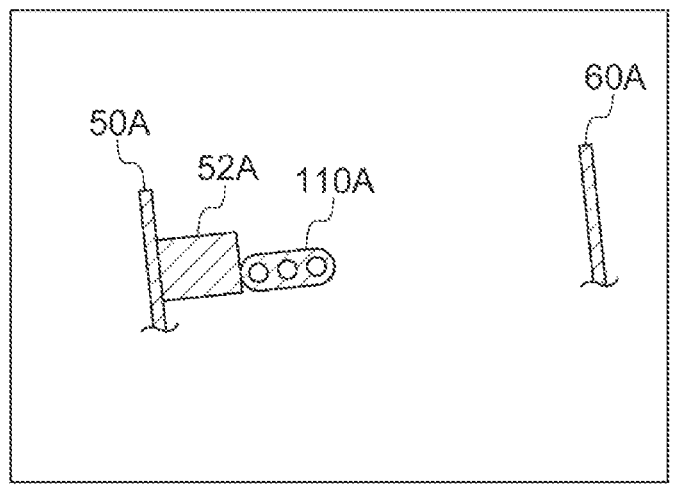
FIG. 3B is a diagram illustrating the traffic signal in front of the vehicle and the surrounding structure recognized by an object recognition unit.

FIG. 3B is a diagram illustrating the traffic signal 110 in front of the vehicle and the surrounding structure recognized by the object recognition unit 13. In FIG. 3B, the traffic signal 110 recognized by the object recognition unit 13 is indicated as a reference sign 100A, the pole 50 is indicated as a reference sign 50A, the road information sign 52 is indicated as a reference sign 52A, and utility pole 60 is indicated as a reference sign 60A. In FIG. 3B, a situation is illustrated, in which the detection range of the radar sensor 3 is blocked by a preceding vehicle of the vehicle M, and thus, the object recognition unit 13 can recognize only the upper part of the pole 50 and the utility pole 60. In addition, it is assumed that the structure is detected to be inclined due to the influence of the vibration or the like while the vehicle M is traveling.

Figure 3C:
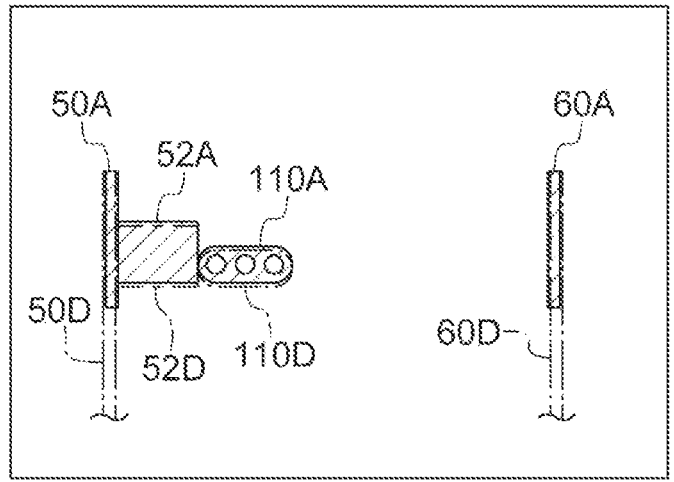
FIG. 3C is a diagram for explaining collation between the traffic signal and the surrounding structure recognized by the object recognition unit and the traffic signal and the surrounding structure in the traffic signal related database.

FIG. 3C is a diagram for explaining the collation between the traffic signal 110 and the surrounding structure recognized by the object recognition unit 13 and the traffic signal 110 and the surrounding structure in the traffic signal related database 5. As illustrated in FIG. 3C, the imaging possibility determination unit 14 performs the collation such that the traffic signal 110D, the pole 50D, the road information sign 52D and the utility pole 60D in the traffic signal related database 5, and the traffic signal 110A, the pole 50A, the road information sign 52A, and utility pole 60A recognized by the object recognition unit 13 match each other. By performing the collation including not only the traffic signal 110 but also the surrounding structure, the imaging possibility determination unit 14 can prevent equipment of the preceding vehicle such as heavy trucks and signboards from being erroneously recognized as the traffic signal 110. In particular, when a separate structure is included in the surrounding structure, the erroneous recognition can be further prevented. It is not necessary to include the separate structure in the surrounding structure.

The imaging possibility determination unit 14 estimates the position (a three-dimensional position) of the traffic signal 110 relative to the vehicle M based on the result of collation. Here, data of the traffic signal 110A and surrounding structure recognized by the object recognition unit 13 is assumed to be M(q). Here, q is three-dimensional relative coordinates from the camera 2 and/or the radar sensor 3. M(q) also includes data of the shape of the traffic signal 110A and the surrounding structure. On the other hand, the traffic signal data and the surrounding structure data in the traffic signal related database 5 are assumed to be D(q). The position of the position of the vehicle on the map recognized by the vehicle position recognition unit 11 (the position recognized from the GPS or the like) relative to the traffic signal 110 is calculated such that the matching between M and D (matching degree of the collation) is maximized, and the position is more accurately corrected. For example, an error $f(q_{correction})$ between M and D indicated in following Equation (1) can be used.

Equation 1

$$f(q_{correction}) = \Sigma \{D(q_{correction}) - M(q)\}^2 \quad (1)$$

The imaging possibility determination unit 14 calculates a position correction amount that minimizes the error $f(q_{correction})$ indicated in Equation (1) described above, and the result of correcting the position of traffic signal 110 relative to the vehicle M using the position correction amount is taken as the final position of the traffic signal 110 relative to final vehicle M. The method of estimating the position (the three-dimensional position) of the traffic signal 110 relative to the vehicle M is not limited to the method described above, and a well-known method may be adopted.

The imaging possibility determination unit 14 determines whether or not the traffic signal 110 can be imaged by the camera 2 based on the position of the traffic signal 110 relative to the vehicle M. If the position of the traffic signal 110 relative to the vehicle M is within the imaging range of the camera 2, the imaging possibility determination unit 14 determines that the traffic signal 110 can be imaged by the camera 2. The imaging range of the camera 2 is a range determined according to the imaging performance of the camera 2 (for example, a distance for the camera 2 to be able to capture the image with image accuracy capable of recognizing the lighting state of the traffic signal).

If the object recognition unit 13 cannot recognize the traffic signal 110 and cannot calculate the relative position of the traffic signal 110, since it is considered that the object recognition unit 13 cannot recognize the traffic signal 110 due to the obstruction such as the preceding vehicle, the imaging possibility determination unit 14 determines that the traffic signal 110 cannot be imaged by the camera 2. In addition, even if the object recognition unit 13 can partially recognize the traffic signal 110 and the relative position of the traffic signal 110 can be calculated, if the object recognition unit 13 cannot recognize at least one of the lighting portions (bulbs or the like) of the traffic signal 110, the imaging possibility determination unit 14 determines that the traffic signal 110 cannot be imaged by the camera 2.

If the object recognition unit 13 can recognize even one of the lighting portions of the traffic signal 110, since there is a possibility that the lighting portion is a currently lit point, the imaging possibility determination unit 14 may determine that the traffic signal can be imaged by the camera 2, and proceed with the processing.

If the position determination unit 12 determines that the vehicle is positioned in the traffic signal recognition range, the position error range calculation unit 15 calculates a position error range of the traffic signal with respect to the vehicle based on the position of the vehicle on the map recognized by the vehicle position recognition unit 11, the result of recognition performed by the object recognition unit 13, and the traffic signal data and the surrounding structure data.

The position error range calculation unit 15 obtains the position error range of the position of the host vehicle relative to the traffic signal based on the result of collation between the traffic signal and the surrounding structure extracted from the traffic signal related database 5 and the result of recognition performed by the object recognition unit 13 described above. As an example, the position error range calculation unit 15 calculates the position error range based on the degree of matching between the traffic signal and the surrounding structure extracted from the traffic signal related database 5, and the traffic signal and the surrounding structure recognized by object recognition unit 13. If the degree of matching is equal to or higher than a threshold value, the position error range calculation unit 15 calculates the position error range as a narrow range compared to a case where the degree of matching is lower than the threshold value. The position error range calculation unit 15 may calculate the position error range as a narrower range as the degree of matching becomes higher.

The position error range calculation unit 15 can obtain the position error range by calculating the Jacobian from the above-described position alignment, and from the diagonal components of the inverse matrix of the matrix obtained by the product of the Jacobians. Specifically, the position error range calculation unit 15 may calculate the position error range using the following Equations (2) and (3).

Equation 2

$$J(q_{correction}) = \{\sigma/\sigma(q_{correction})\} \cdot \Sigma\{D(q_{correction}) - M(q)\} \quad (2)$$

$$\text{Position error range} = \text{diag}\{J(q_{correction}) \cdot J(q_{correction})^T\}^{1/2} \quad (3)$$

In addition, the position error range calculation unit 15 may calculate the position error range in consideration of the sensor accuracy. By obtaining the position error range of the position of the host vehicle with respect to traffic signal adopting various well-known methods used for calculating the error of host vehicle position recognition, the position error range calculation unit 15 can also calculate the position error range of the traffic signal with respect to the vehicle.

If it is determined by the imaging possibility determination unit 14 that the traffic signal can be imaged by the camera 2, the search area setting unit 16 sets a search area (region of interest: ROI) in the captured image. The search area means an area in the captured image, on which the image recognition processing is performed for recognizing the lighting state of the traffic signal.

If it is determined by the imaging possibility determination unit 14 that the traffic signal can be imaged by the camera 2, the search area setting unit 16 recognizes the position of the traffic signal in the image captured by the camera 2 based on the result of collation between the traffic signal and the surrounding structure extracted from the traffic signal related database 5 and the result of recognition performed by the object recognition unit 13. The search area setting unit 16 can recognize the position of the traffic signal in the captured image using a well-known method. The search area setting unit 16 sets the search area such that the position of the traffic signal in the captured image is included.

The search area setting unit 16 sets the search area having a size corresponding to the position error range calculated by the position error range calculation unit 15. If the size of the position error range is equal to or larger than an error range threshold value, the search area setting unit 16 sets the search area as a larger area compared to a case where the size of the position error range is smaller than the error range threshold value. Alternatively, the search area setting unit 16 sets the search area as a larger area as the position error range becomes larger.

Figure 4A:
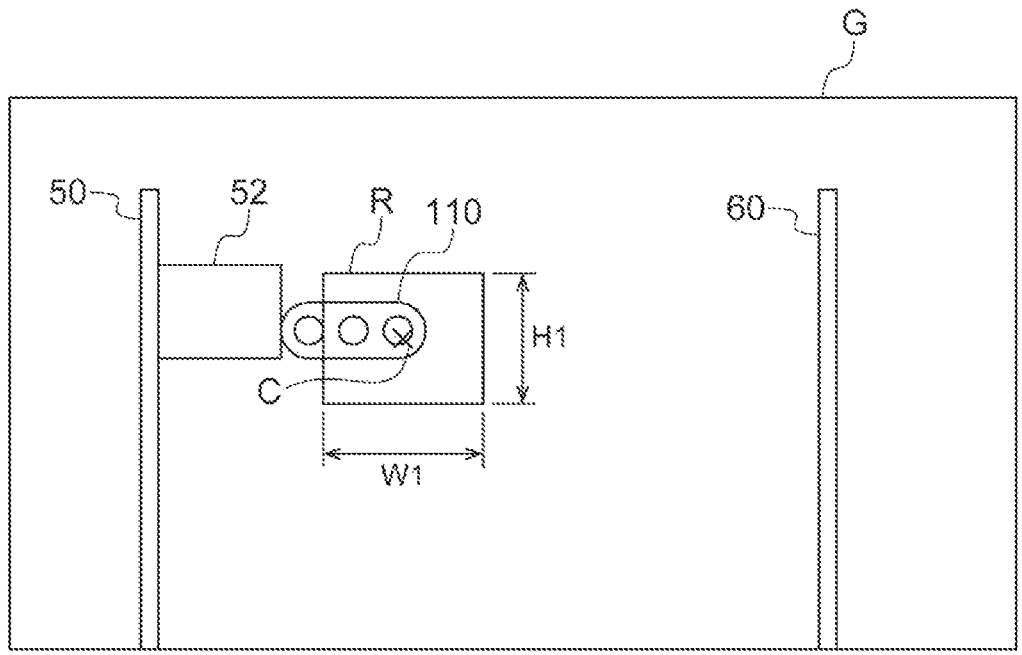
FIG. 4A is a diagram illustrating setting of a search area in an image captured by a camera.

FIG. 4A is a diagram illustrating the setting of the search area in the image captured by the camera 2. FIG. 4A illustrates a captured image 3, a search area R, and a center position C of the search area R. Here, the search area R is set as a horizontally long rectangular area, and a width of the search area R is indicated as W1, and the height is indicated as H1. The shape of the search area R is not limited to a rectangular shape, and may be an elliptical shape, a circular shape, a polygonal shape or another shape.

In FIG. 4A, the search area setting unit 16 sets the search area R having a size corresponding to the position recognition error of the traffic signal 110. However, for example, a situation in which the traffic signal 110 is deviated from the search area R due to influence such as positional deviation of the camera 2 may be illustrated. In FIG. 4A, one of the three lighting portions of traffic signal 110 is deviated from the search area R.

When the search area is set, the traffic signal recognition unit 17 recognizes the lighting state of the traffic signal in the search area R. The traffic signal recognition unit 17 recognizes the lighting state of the traffic signal by performing image recognition (pattern matching considering the color, for example) in the search area R. The processing content of the image recognition is not particularly limited, and any processing may be used as long as the lighting state of the traffic signal can be recognized. The traffic signal recognition unit 17 recognizes whether the lighting state of the traffic signal is the passing permission lighting state, the transition lighting state, or the passing prohibition lighting state.

If the traffic signal is not included in the search area R, the traffic signal recognition unit 17 performs processing for enlarging the search area R, and then, re-recognizes the lighting state of the traffic signal in the search area R. While the lighting state of the traffic signal in search area R cannot be recognized, the traffic signal recognition unit 17 repeats the enlargement processing and the re-recognition until the number of times of enlargement processing reaches equal to or higher than the number of times threshold value. The enlargement processing means processing for enlarging the size of the search area R. The number of times threshold value is a threshold value set in advance. The number of times threshold value may be a fixed value or a value changed according to the position error range or the like.

Specifically, in the situation illustrated in FIG. 4A, the traffic signal recognition unit 17 recognizes the lighting state of the traffic signal 110 by the image recognition in the search area R. If two lighting portions included in the search area R among the three lighting portions of the traffic signal 110 is lit, the traffic signal recognition unit 17 can recognize the lighting state of the traffic signal 110 by the image recognition.

Figure 4B:
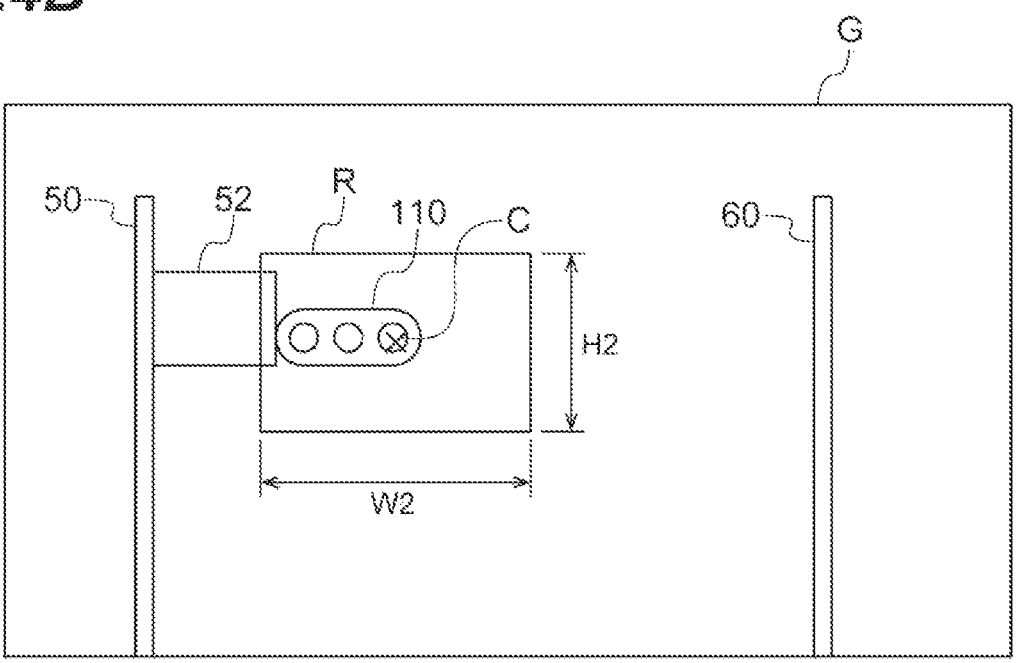
FIG. 4B is a diagram for explaining processing for enlarging the search area.

On the other hand, if the lighting portion deviated from the search area R among the three lighting portions of the traffic signal 110 is lit, the traffic signal recognition unit 17 cannot recognize the lighting state of the traffic signal 110 in the search area R by the image recognition. In this case, the traffic signal recognition unit 17 performs the processing for enlarging the search area R. FIG. 4B is a diagram for explaining the search area R enlargement processing. FIG. 4B illustrates the search area R after the enlargement processing, a width W2 of the search area R after the enlargement processing, and a height H2 of the search area R after the enlargement processing. The width W2 of the search area R after the enlargement processing is wider than the width W1 of the search area R illustrated in FIG. 4A, and the height H2 of the search area R after the enlargement processing is higher than the height H1 of the search area R illustrated in FIG. 4A.

As illustrated in FIG. 4A, since the entire area of the traffic signal 110 is included in the search area R by the enlargement processing, the traffic signal recognition unit 17 can perform the recognition of the lighting state of the traffic signal 110 by the image recognition (re-recognition) in the search area R. If the lighting state of the traffic signal 110 cannot be recognized even by the re-recognition after the enlargement processing, the traffic signal recognition unit 17 repeats the re-recognition after the processing for enlarging the search area R again. The traffic signal recognition unit 17 repeats the enlargement processing and re-recognition until the number of times of enlargement processing becomes equal to or greater than the number of times threshold value.

Processing by Traffic Signal Recognition Device in First Embodiment

Figure 5:
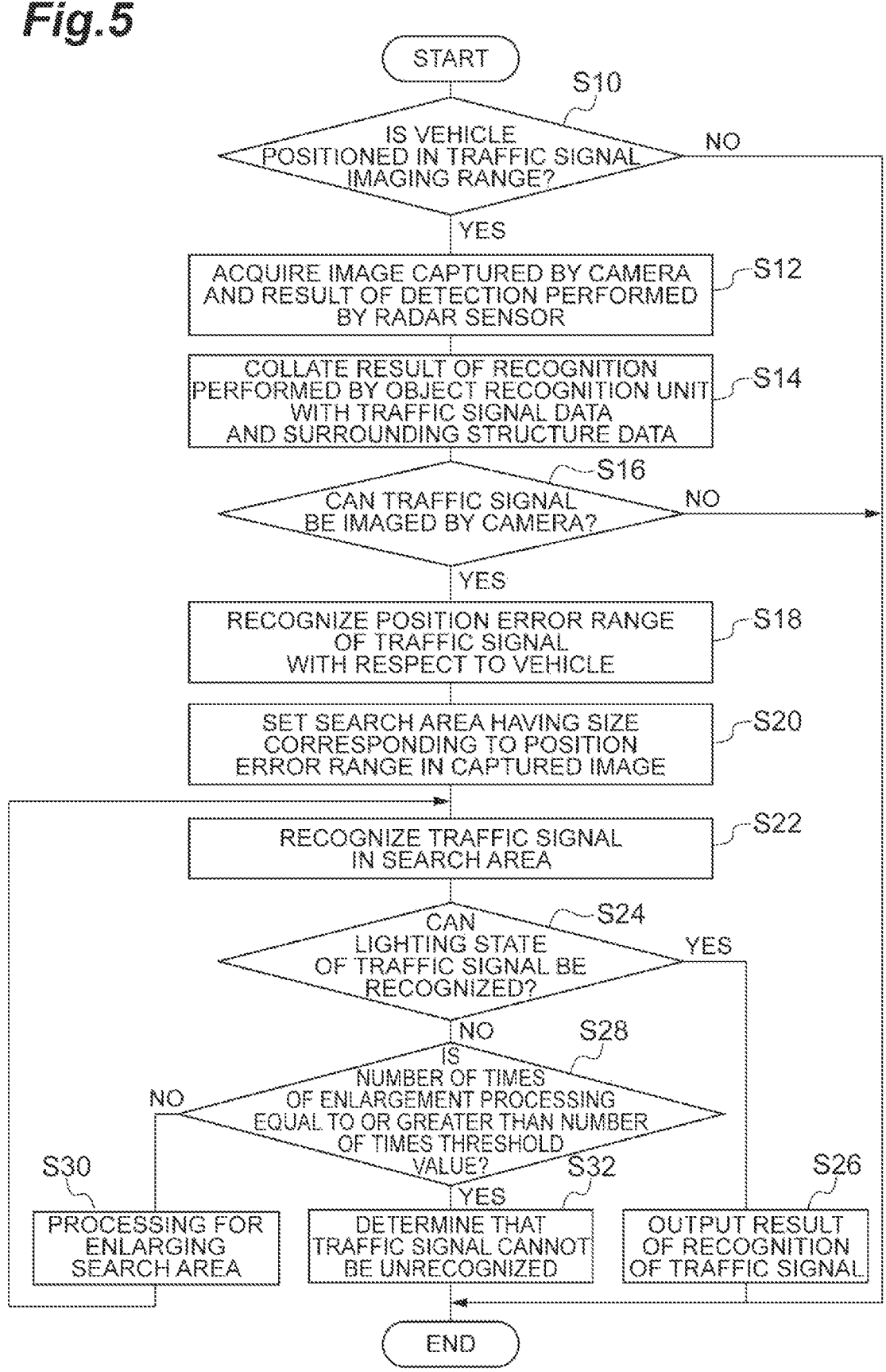
FIG. 5 is a flowchart illustrating an example of traffic signal recognition processing.

Next, an example of the traffic signal recognition processing performed by the traffic signal recognition device 100 in the present embodiment will be described with reference to FIG. 5. FIG. 5 is a flowchart illustrating an example of the traffic signal recognition processing. The processing in the flowchart illustrated in FIG. 5 is executed, for example, while the vehicle is traveling.

As illustrated in FIG. 5, as S10, the ECU 10 of the traffic signal recognition device 100 determines whether or not the vehicle is positioned in the traffic signal recognition range using the position determination unit 12. The position determination unit 12 performs the above-described determination based on the position of the vehicle on the map recognized by the vehicle position recognition unit 11 and the position of the traffic signal on the map in the traffic signal data. If it is not determined that the vehicle is positioned in the traffic signal recognition range (NO in S10), the ECU 10 ends the current processing. Thereafter, the ECU 10 starts the determination in S10 again after a certain time has elapsed. If it is determined that the vehicle is positioned in the traffic signal recognition range (YES in S10), the ECU 10 makes the process proceed to S12.

In S12, the ECU 10 acquires the image captured by the camera 2 and the result of detection performed by the radar sensor 3. The object recognition unit 13 recognizes objects around the vehicle M based on the image captured by the camera 2 and the result of detection performed by the radar sensor 3. Thereafter, the ECU 10 makes the process proceed to S14.

In S14, the ECU 10 collates the result of recognition performed by the object recognition unit 13 with the traffic signal data and the surrounding structure data using the imaging possibility determination unit 14. First, the imaging possibility determination unit 14 extracts the traffic signals and the surrounding structures existing around the vehicle from the traffic signal data and the surrounding structure data included in traffic signal related database 5 referring to the position of the vehicle on the map. The imaging possibility determination unit 14 collates the traffic signal and the surrounding structure extracted from the traffic signal related database 5 with the result of recognition performed by the object recognition unit 13. Thereafter, the ECU 10 makes the process proceed to S16.

In S16, the ECU 10 determines whether or not the traffic signal can be imaged by the camera 2 using the imaging possibility determination unit 14. The imaging possibility determination unit 14 performs the above determination by estimating the relative position of the traffic signal with respect to the vehicle based on the result of collation. If it is determined that the traffic signal cannot be imaged by the camera 2 (NO in S16), the ECU 10 ends the current processing. Thereafter, the ECU 10 starts the determination in S10 again after a certain time has elapsed. If it is determined that the traffic signal can be imaged by the camera 2 (YES in S16), the ECU 10 makes the process proceed to S18.

In S18, the ECU 10 calculates the position error range of the traffic signal with respect to the vehicle using the position error range calculation unit 15. The position error range calculation unit calculates the position error range of the traffic signal with respect to the vehicle based on the position of the vehicle on the map recognized by the vehicle position recognition unit 11, the result of recognition performed by the object recognition unit 13, and the traffic signal data and the surrounding structure data. Thereafter, the ECU 10 makes the process proceed to S20.

In S20, the ECU 10 sets a search area having a size corresponding to the position error range calculated by the position error range calculation unit 15 using the search area setting unit 16. If the size of the position error range is equal to or greater than the error range threshold value, the search area setting unit 16 sets the search area as larger area compared to a case where the size of the position error range is smaller than the error range threshold value. Thereafter, the ECU 10 makes the process proceed to S22.

In S22, in the ECU 10, if a search area R is set, the traffic signal recognition unit 17 performs the traffic signal recognition for recognizing the lighting state of the traffic signal in the search area R. The traffic signal recognition unit 17 recognizes the lighting state of the traffic signal by performing image recognition in the search area R. Thereafter, the ECU 10 makes the process proceed to S24.

In S24, the ECU 10 determines whether or not the lighting state of the traffic signal can be recognized using the traffic signal recognition unit 17. If it is determined that the lighting state of the traffic signal can be recognized (YES in S24), the ECU 10 makes the process proceed to S26. If it is determined that the lighting state of the traffic signal cannot be recognized (NO in S24), the ECU 10 makes the process proceed to S28.

In S26, the ECU 10 outputs the result of recognition of the traffic signal. The ECU 10 outputs the result of recognition of the traffic signal to an autonomous driving system of a vehicle connected to the traffic signal recognition device 100. Thereafter, the ECU 10 ends the current processing and starts the determination in S10 again after a certain time elapses.

In S28, the ECU 10 determines whether or not the number of times of enlargement processing is equal to or greater than the number of times threshold value using the traffic signal recognition unit 17. If it is determined that the number of times of the enlargement processing is not equal to or greater than the number of times threshold value (NO in S28), the ECU 10 makes the process to proceed to S30. If it is determined that the number of times of the enlargement processing is equal to or greater than the number of times threshold value (YES in S28), the ECU 10 makes the process to proceed to S32.

In S30, the ECU 10 performs the enlargement processing of the search area R using the traffic signal recognition unit 17. The traffic signal recognition unit 17 sets a search area R of which the size is enlarged on the image captured by camera 2. Thereafter, the ECU 10 makes the process return to S22 and performs the traffic signal recognition (re-recognition).

In S32, the ECU 10 determines that the traffic signal cannot be unrecognized. Since the traffic signal cannot be recognized even when the processing for enlarging the search area R is repeated until the number of times becomes equal to or greater than the number of times threshold value, the ECU 10 determines that the image cannot be captured. Thereafter, the ECU 10 ends the current processing and starts the determination in S10 again after a predetermined time elapses.

Operation Effects of Traffic Signal Recognition Device in First Embodiment

According to the traffic signal recognition device 100 in the first embodiment described above, if it is determined that the vehicle is positioned in the traffic signal recognition range, since whether or not the traffic signal can be imaged by the camera is determined using the surrounding structure data as well as the traffic signal data, it is possible to improve the accuracy of the determination whether or not the traffic signal can be imaged compared to the case where only the traffic signal data is used. In addition, in the traffic signal recognition device 100, if it is determined that the traffic signal can be imaged by the camera 2, since a search area having a size corresponding to the position error range is set in the captured image, it is possible to set the search area R having an appropriate size considering the position error range. Moreover, in the traffic signal recognition device 100, when the lighting state of the traffic signal cannot be recognized within the search area R, the traffic signal is re-recognized in the search area after the processing for enlarging the search area R, while the lighting state of the traffic signal cannot be recognized, the enlargement processing and the re-recognition are repeated until the number of times of enlargement processing becomes equal to or greater than the number of times threshold value. Therefore, even if the positional deviation of the search area R occurs, the lighting state of the traffic signal can be recognized by enlarging the search area R, it is possible to prevent the problem in that the lighting state of the traffic signal cannot be recognized due to the positional deviation of the search area R.

Second Embodiment

Subsequently, a traffic signal recognition device in a second embodiment will be described with reference to the drawings. The traffic signal recognition device in the second embodiment differs from that in the first embodiment in a point that processing is performed in consideration of a type of the traffic signal.

Configuration of Traffic Signal Recognition Device in Second Embodiment

Figure 6:
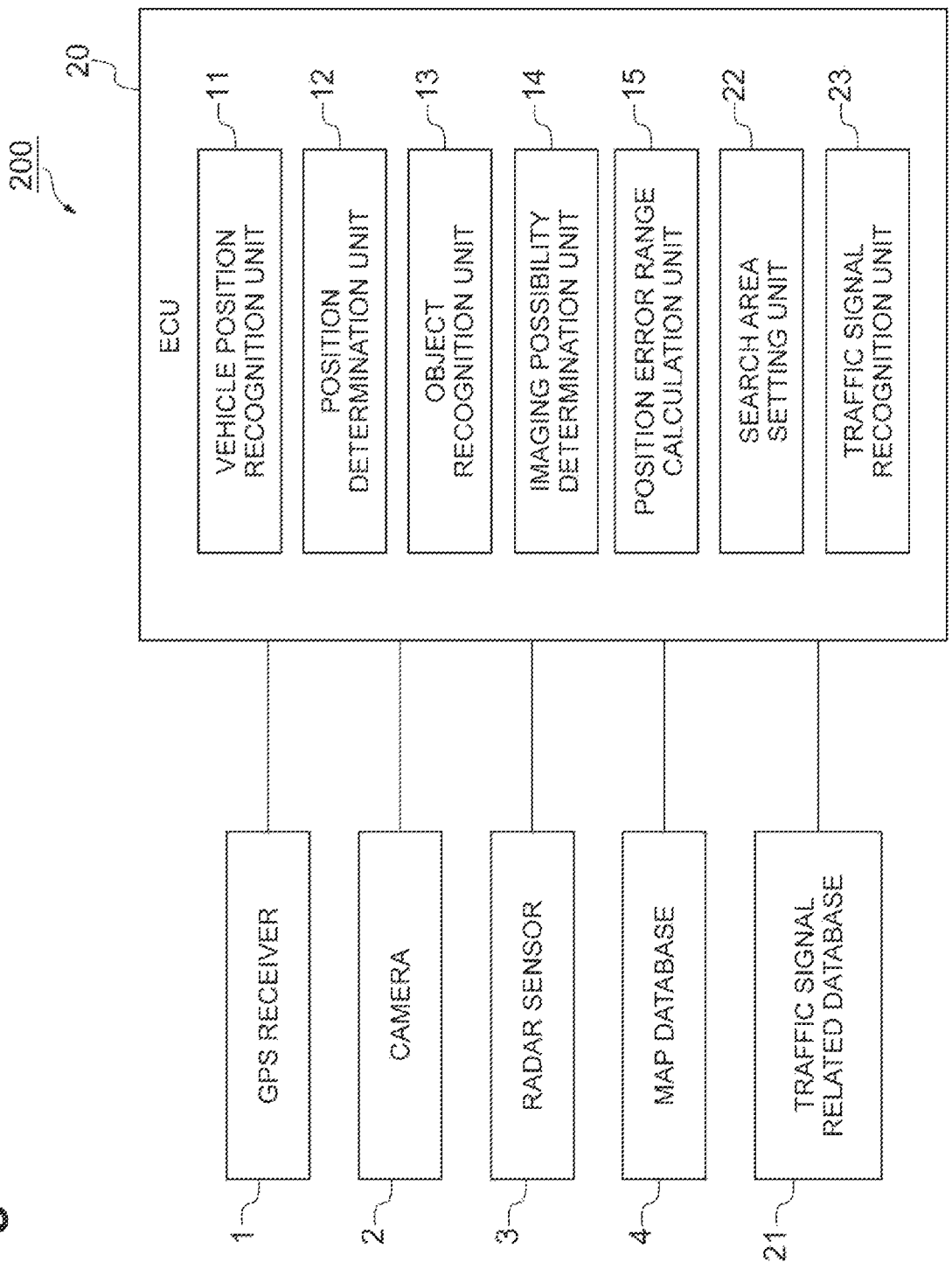
FIG. 6 is a block diagram illustrating a traffic signal recognition device in a second embodiment.

FIG. 6 is a block diagram illustrating the traffic signal recognition device in the second embodiment. As illustrated in FIG. 6, a traffic signal recognition device 200 in the second embodiment differs from the traffic signal recognition device in the first embodiment in a point that, in a traffic signal related database 21, some data contents are added, and in a search area setting unit 22 and a traffic signal recognition unit 23 of the ECU 20, some functions are added.

In traffic signal related database 21, information on the type of the traffic signal is stored in the traffic signal data in addition to the content in the first embodiment. The information on the type of the traffic signal includes at least the information on whether or not the traffic signal is a hanging type. The information on the type of the traffic signal may include information on whether the traffic signal is a horizontal arrangement type or a vertical arrangement type.

Figure 7A:
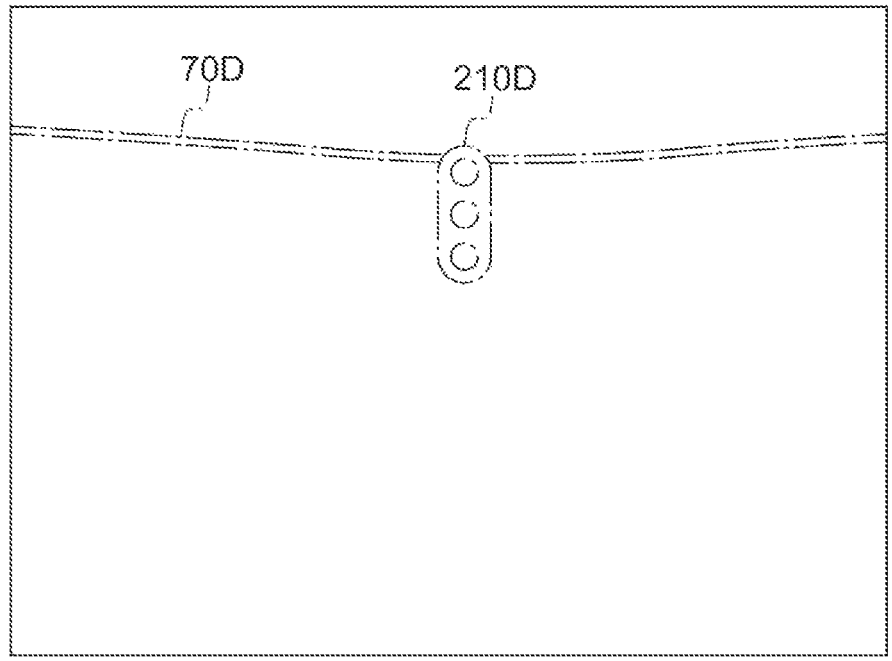
FIG. 7A is a diagram illustrating a hanging type traffic signal in front of the vehicle and a surrounding structure extracted from the traffic signal related database.

Here, FIG. 7A is a diagram illustrating a hanging type traffic signal in front of the vehicle estimated from the position of the vehicle on the map and the traffic signal related database. FIG. 7A illustrates a hanging type traffic signal in the traffic signal related database 21 indicated by a reference sign 210D and a suspending wire (surrounding structure) indicated by a reference sign 70D. In FIG. 7A, a situation at the initial stage of the installation of the hanging type traffic signal is illustrated.

Figure 7B:
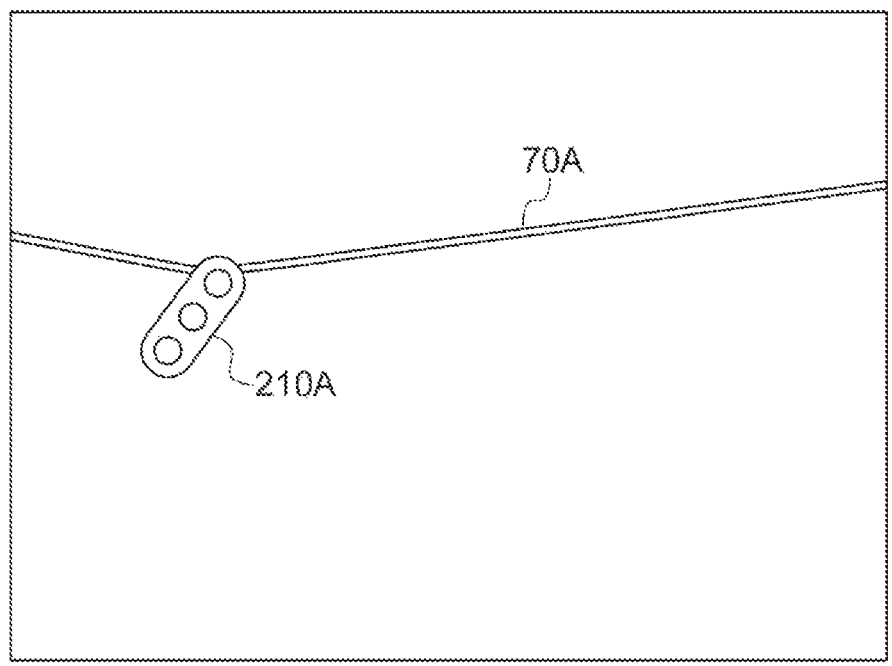
FIG. 7B is a diagram illustrating the hanging type traffic signal in front of the vehicle and the surrounding structure recognized by the object recognition unit.

FIG. 7B is a diagram illustrating the hanging type traffic signal and the surrounding structure in front of the vehicle recognized by the object recognition unit 13. FIG. 7B illustrates the hanging type traffic signal indicated by a reference sign 210A and the suspending wire (surrounding structure) indicated by a reference sign 70A, which are recognized by the object recognition unit 13. FIG. 7B illustrates a situation in which the position and the inclination of the hanging type traffic signal are significantly changed from the initial stage due to the influence of a wind and a deflection of the suspending wire.

As illustrated in FIG. 7A and FIG. 7B, the three-dimensional position of the hanging type traffic signal is significantly changed due to the influence of the wind and the deflection of the suspending wire. In addition, it cannot be said that the suspending wire is suitable for the surrounding structure because the three-dimensional position is changed due to the wind and the like. In the places where such hanging type traffic signals are provided, at the surroundings, there may be no suitable surrounding structure such as a utility pole having less positional change.

Therefore, the search area setting unit 22 determines whether or not the type of the traffic signal is a hanging type based on the traffic signal determined by the imaging possibility determination unit 14 and the traffic signal data in the traffic signal related database 21. If the type of the traffic signal is a hanging type, the search area setting unit 22 sets the search area R having a size set in advance suitable for the hanging type in the captured image.

Figure 8:
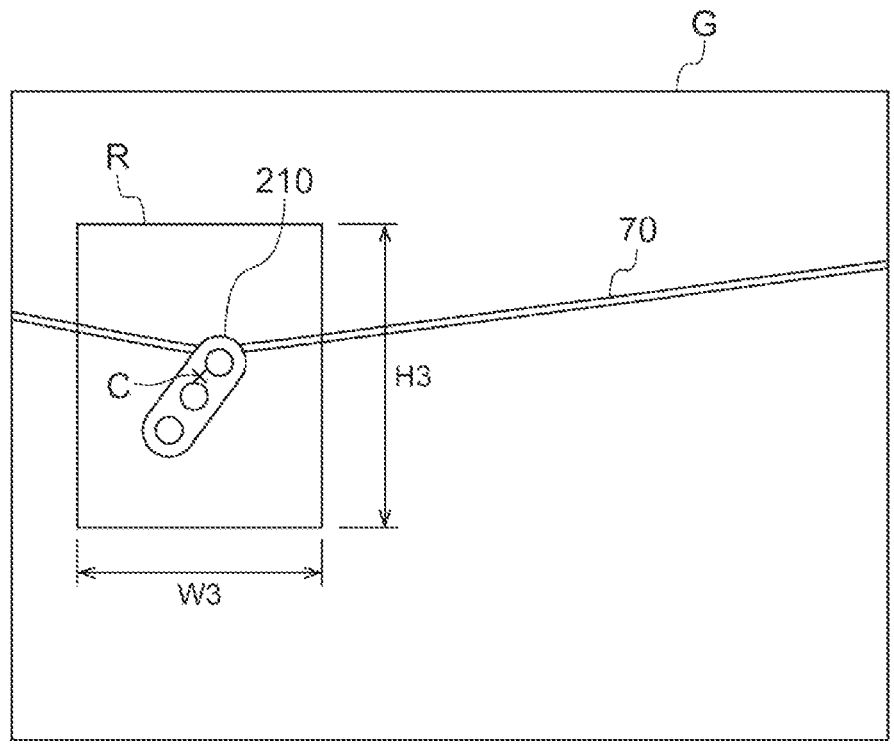
FIG. 8 is a diagram illustrating setting of a search area having a size suitable for the hanging type traffic signal.

Here, FIG. 8 is a diagram illustrating setting of the search area R having a size suitable for hanging type. As illustrated in FIG. 8, if the type of the traffic signal is a hanging type, the search area setting unit 22 sets a large search area R from the beginning. The width W3 of the search area R is wider than the width W1 in the first embodiment, for example, and the height H3 of the search area R is higher than the height H1 in the first embodiment. If the type of the traffic signal is a hanging type, the search area setting unit 22 may set the search area R as a vertically elongated rectangular area.

In addition, when the type of the traffic signal is not a hanging type, the search area setting unit 22 may set the search area R as an horizontally elongated rectangular area if the traffic signal is a horizontal arrangement type from the information on the type of the traffic signal, and may set the search area R as a vertically elongated rectangular area type if the traffic signal is a vertical arrangement type.

If the type of the traffic signal is a hanging type, even when the lighting state of the traffic signal cannot be recognized in the search area R, the traffic signal recognition unit 23 does not perform the processing for enlarging the search area R. That is, if the type of the traffic signal is a hanging type, since there is a possibility that the three-dimensional position of the traffic signal significantly deviates from the position stored in the traffic signal related database 21, the traffic signal recognition unit 23 does not repeat the processing for enlarging the search area R and re-recognition, and suppresses the occurrence of unnecessary arithmetic processing when the traffic signal recognition unit 23 cannot recognize the lighting state of the traffic signal in the search area R set large.

Processing by Traffic Signal Recognition Device in Second Embodiment

Next, processing by the traffic signal recognition device 200 in the second embodiment will be described with reference to FIG. 9.

FIG. 9 is a flowchart illustrating an example of the traffic signal type determination processing. As an example, the processing in the flowchart illustrated in FIG. 9 is executed when it is determined that the traffic signal can be imaged by the camera (that is, when the traffic signal of the imaging target is specified) in the traffic signal recognition processing in S16 illustrated in FIG. 5.

As illustrated in FIG. 9, as S40, the ECU 20 of the traffic signal recognition device 200 determines whether or not the type of the traffic signal is a hanging type using the search area setting unit 22. The search area setting unit 22 determines whether or not the type of the traffic signal is a hanging type based on the traffic signal determined by the imaging possibility determination unit 14 and the traffic signal data in the traffic signal related database 21. If the type of the traffic signal is not determined to be a hanging type (NO in S40), the ECU 20 ends the current processing. If the type of the traffic signal is determined to be a hanging type (YES in S40), the ECU 20 makes the process proceed to 842.

In S42, the ECU 20 sets the search area R having a size suitable for the hanging type using the search area setting unit 22. The search area setting unit 22 sets the search area R having the size set in advance suitable for the hanging type in the captured image. Thereafter, the ECU 20 makes the process proceed to S44.

In S44, the ECU 20 prohibits the processing for enlarging the search area R using the traffic signal recognition unit 23. That is, even if the lighting state of the hanging type traffic signal cannot be recognized, the traffic signal recognition unit 23 does not perform the processing for enlarging the search area R and the re-recognition. Thereafter, the ECU 20 ends the current processing.

Operational Effects of Traffic Signal Recognition Device in Second Embodiment

According to the traffic signal recognition device 200 in the second embodiment described above, if the type of the traffic signal of the imaging target is a hanging type, in many cases, a surrounding structure such as a signboard does not exist near the traffic signal and the position of the traffic signal is changed due to the wind and the deflection of the suspending wire. Therefore, a search area having a size set in advance suitable for the hanging type is set rather than the search area having a size corresponding to the position error range. In addition, if the type of the traffic signal is a hanging type, the traffic signal recognition device 200 does not perform the processing for enlarging the search area and the re-recognition. As a result, in the traffic signal recognition device 200, it is possible to avoid repeating the unnecessary arithmetic processing in the hanging type traffic signal in which it is difficult to recognize the position and the position error range of the traffic signal with sufficient accuracy.

The preferred embodiments of the present disclosure have been described above, however, the present disclosure is not limited to the above-described embodiments. The present disclosure can be implemented in various forms including various modifications and improvements based on knowledge of those skilled in the art, including the above-described embodiments.

In the embodiment described above, the traffic signal in front of the vehicle has been described, but the traffic signal around the vehicle may be taken as the imaging target. In addition, the radar sensor 3 may not be necessarily provided.

If the position error range calculated by the position error range calculation unit 15 is smaller than the determination threshold value, the search area setting unit 16 may set a search area R having a size including the lighting portion of the traffic signal. The determination threshold value is a threshold value set in advance to determine whether or not the position error range is small and the position of the traffic signal can be recognized with high accuracy. If the position error range is smaller than the determination threshold value, the search area setting unit 16 can set a narrow search area R so as to include only the lighting portion of the traffic signal because the position of the traffic signal can be recognized with high accuracy. Therefore, it is possible to recognize the lighting state of the traffic signal with less image recognition processing. In this case, if the lighting state of the traffic signal within the narrow search area R cannot be recognized, the traffic signal recognition unit 17 performs the re-recognition after performing the processing for enlarging the search area R. While the traffic signal recognition unit 17 cannot recognize the lighting state of the traffic signal in the search area R, the traffic signal recognition unit 17 repeats the enlargement processing and the re-recognition until the number of times of enlargement processing becomes equal to or greater than the number of times threshold value.

The number of times threshold value may be a value to be changed based on at least one of the processing load of the ECU 10, the traveling situation of the vehicle (vehicle speed, acceleration, yaw rate, and the like), the size of the initially set search area R, and the like.

What is claimed is:

1. A traffic signal recognition device that is configured to set a search area in an image captured by a camera in a vehicle and to recognize a traffic signal in the search area, comprising:

a vehicle position recognition unit configured to recognize a position of the vehicle on a map;

an object recognition unit configured to recognize an object around the vehicle based on at least one of a result of detection performed by a radar sensor in the vehicle and the image captured by the camera;

a traffic signal related database configured to store traffic signal data including information on a position of the traffic signal on the map and information on a shape of the traffic signal, and surrounding structure data including information on a position of a surrounding structure on the map existing around the traffic signal and information on a shape of the surrounding structure;

a position determination unit configured to determine whether or not the vehicle is positioned in a traffic signal recognition range set in advance based on the position of the vehicle on the map and the information on the position of the traffic signal on the map;

an imaging possibility determination unit configured to determine whether or not the traffic signal can be imaged by the camera, based on the position of the vehicle on the map, a result of recognition performed by the object recognition unit, the traffic signal data and the surrounding structure data, if it is determined by the position determination unit that the vehicle is positioned in the traffic signal recognition range;

a position error range calculation unit configured to recognize a position error range of the traffic signal with respect to the vehicle based on the result of recognition performed by the object recognition unit, the traffic signal data and the surrounding structure data, if it is determined by the position determination unit that the vehicle is positioned in the traffic signal recognition range;

a search area setting unit configured to set the search area having a size corresponding to the position error range in the captured image, if it is determined by the imaging possibility determination unit that a traffic signal can be imaged by the camera; and a traffic signal recognition unit configured to recognize a lighting state of the traffic signal in the search area, if the search area is set, wherein the traffic signal recognition unit is configured to re-recognize the lighting state of the traffic signal in the search area after performing the processing for enlarging the search area when the lighting state of the traffic signal in the search area cannot be recognized, and while the lighting state of the traffic signal in the search area cannot be recognized, the traffic signal recognition unit repeats the enlargement processing and the re-recognition until the number of times of the enlargement processing is equal to or greater than a number of times threshold value.

2. The traffic signal recognition device according to claim 1, wherein the traffic signal data includes information on the type of the traffic signal, wherein, if the type of the traffic signal is a hanging type, the search area setting unit sets the search area having a size set in advance suitable for the hanging type rather than the search area having a size corresponding to the position error range, and wherein, if the type of the traffic signal is a hanging type, even when the lighting state of the traffic signal cannot be recognized in the search area, the traffic signal recognition unit does not perform the enlargement processing and the re-recognition.

* * * * *